(12) United States Patent
Ji

(10) Patent No.: US 8,135,446 B2
(45) Date of Patent: Mar. 13, 2012

(54) APPARATUS AND METHOD FOR MAXIMUM POWER SAVING IN SLEEP MODE

(75) Inventor: Baowei Ji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 12/853,779

(22) Filed: Aug. 10, 2010

(65) Prior Publication Data

US 2011/0053657 A1    Mar. 3, 2011

Related U.S. Application Data

(60) Provisional application No. 61/237,264, filed on Aug. 26, 2009.

(51) Int. Cl.
*H04W 88/02* (2009.01)

(52) U.S. Cl. ....................................................... 455/574

(58) Field of Classification Search ............... 455/574, 455/127.5, 343.1, 343.4, 425, 453; 370/255, 370/252, 311, 328, 338; 713/340; 710/18
See application file for complete search history.

(56) References Cited

U.S. PATENT DOCUMENTS

2011/0019602 A1* 1/2011 Park et al. .................... 370/311
* cited by examiner

*Primary Examiner* — Diane Mizrahi
(74) *Attorney, Agent, or Firm* — Jefferson IP Law, LLP

(57) ABSTRACT

An apparatus and method for an improved sleep mode in a mobile terminal are provided. The apparatus includes a transceiver for communicating with a base station, a modem for modulating and demodulating signals for transmission via the transceiver or received via the transceiver, and a controller for controlling a sleep cycle of the mobile terminal, the sleep cycle including a listening window and a sleep window. The controller controls the sleep cycle based on an Advanced Mobile Station (AMS) timer, a Hybrid Repeat Request (HARQ) Downlink (DL) Retransmission timer, a HARQ DL Gap timer, and a HARQ Uplink (UL) Gap timer.

16 Claims, 14 Drawing Sheets

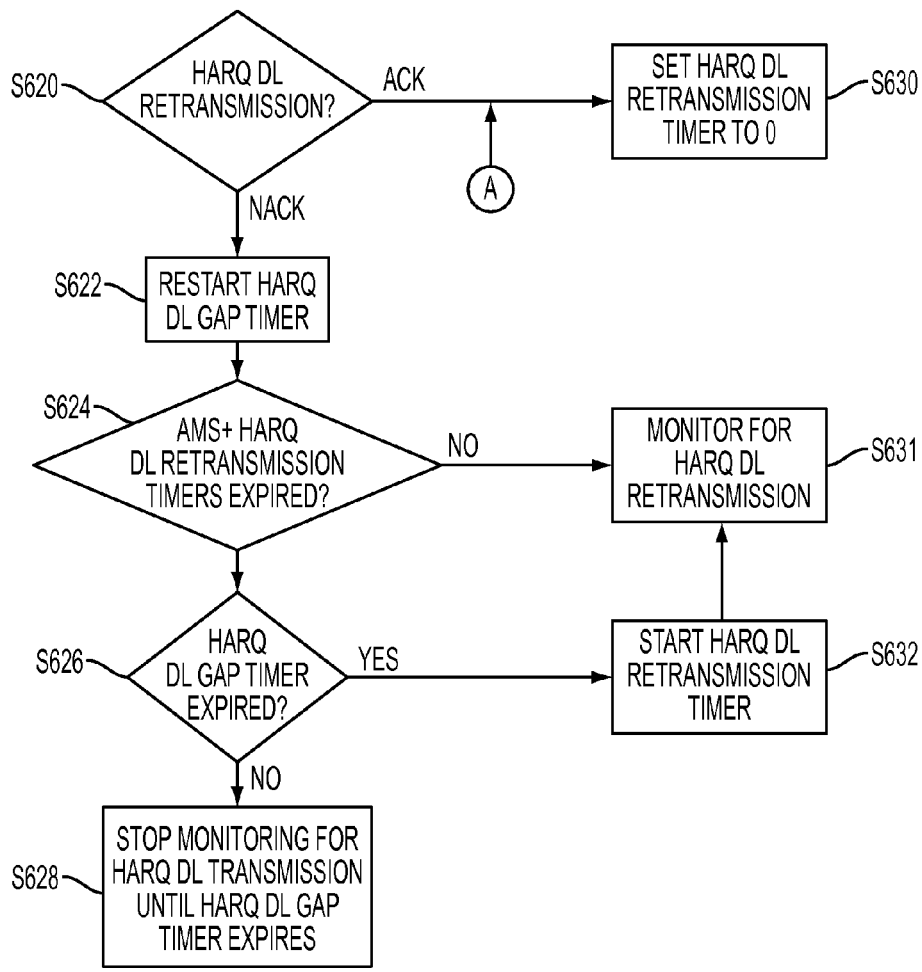
FIG. 6B
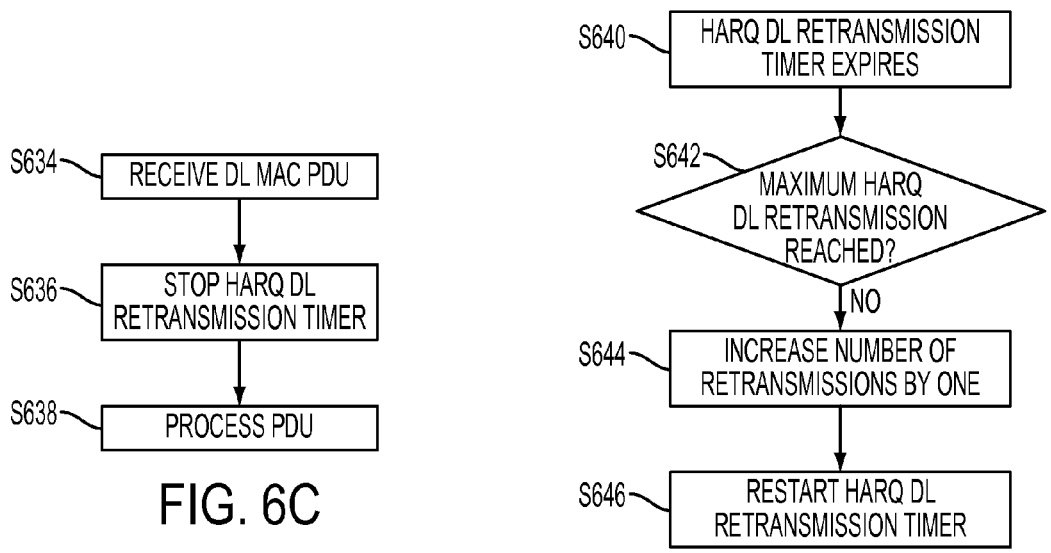
FIG. 6C
FIG. 6D

APPARATUS AND METHOD FOR MAXIMUM POWER SAVING IN SLEEP MODE

CROSS-REFERENCE TO RELATED APPLICATION

This application claims the benefit under 35 U.S.C. §119 (e) of a U.S. Provisional application filed on Aug. 26, 2009 in the U.S. Patent and Trademark Office and assigned Ser. No. 61/237,264, the entire disclosure of which is hereby incorporated by reference.

BACKGROUND OF THE INVENTION

1. Field of the Invention

The present invention relates to wireless communication. More particularly, the present invention relates to an apparatus and method for reducing power consumption in mobile terminals.

2. Description of the Related Art

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

A sleep mode is a state in which an Advanced Mobile Station (AMS) conducts pre-negotiated periods of absence from the serving Advanced Base Station (ABS) air interface. An AMS may activate sleep mode when the AMS is in the connected state. When the sleep mode is active, the AMS is provided with a series of sleep cycles. Each sleep cycle typically includes a listening window followed by a sleep window.

During the sleep window, the ABS does not transmit any data to the AMS. The AMS may power down one or more physical operation components or perform other activities that do not require communication with the ABS.

During the listening window, the AMS is typically expected to receive all Downlink (DL) transmissions in the same way as in the state of normal operations. The AMS generally ensures that it has up-to-date system information for proper operation. The synchronization and system configuration information acquisition and verification may be done by waking up at the super frame header just prior to the frame in which its listening window is located to ensure that the super frame number and the system configuration description change count are as expected. Upon wakeup from sleep state, if the AMS detects that it is not synchronized, or the AMS detects a different ABS, the AMS exits sleep mode and performs network re-entry. If the AMS detects that the information it has is not up-to-date, then the AMS does not transmit in the Listening window until the AMS receives up-to-date system information.

The length of successive sleep cycles may remain constant or may be adaptive based on traffic conditions. Sleep windows and listening windows may also be dynamically adjusted for the purpose of data transportation as well as for MAC control signaling transmission. The AMS may send and receive data and MAC control signaling without deactivating sleep mode.

However, existing sleep mode schemes are inefficient in that, under some circumstances, the AMS may extend the listening window unnecessarily, thereby increasing power consumption. Accordingly, there is a need for an apparatus and method for improving power saving while operating in a sleep mode.

SUMMARY OF THE INVENTION

An aspect of the present invention is to address at least the above-mentioned problems and/or disadvantages and to provide at least the advantages described below. Accordingly, an aspect of the present invention is to provide an apparatus and method for improving power saving while operating in a sleep mode.

In accordance with an aspect of the present invention, a method for improving power saving while operating in a sleep mode is provided. The method includes entering, by the mobile terminal, a listening window of the sleep cycle; remaining in the listening window while an Advanced Mobile Station (AMS) timer maintained by the mobile terminal has not expired, while a Hybrid Automatic Repeat Request (HARQ) Downlink (DL) Retransmission timer has not expired, while a maximum number of Uplink (UL) retransmissions has not been reached, while UL traffic from the mobile station is pending for transmission, or while a default listening window has not expired and no negative traffic indication has been received from a base station; transitioning, by the mobile terminal, from the listening window to a sleep window of the sleep cycle when the mobile terminal receives a negative traffic indication from the base station or when the AMS timer, the HARQ DL Retransmission timer, a HARQ DL Gap timer, and a HARQ UL Gap timer have all expired, wherein the mobile terminal does not transmit or receive data to or from the base station while operating in the sleep window.

In accordance with another aspect of the present invention, a method for managing a sleep cycle of a mobile terminal in a base station is provided. The method includes determining that the mobile terminal is still in a listening window of the sleep cycle when the listening window has not been expressly terminated by the base station, an Advanced Base Station (ABS) timer managed by the base station has not expired, a Hybrid Automatic Repeat Request (HARQ) Downlink (DL) Retransmission timer managed by the base station has not expired, a number of retransmissions of a DL HARQ burst is not equal to a maximum number of DL HARQ burst retransmissions, and a default listening window period has not ended and a negative traffic indicator has not been sent to the mobile terminal; and determining that the mobile terminal has entered a sleep window of the sleep cycle when a negative traffic indicator is transmitted to the mobile terminal from the base station, and the ABS timer, the HARQ DL Retransmission timer, a HARQ DL Gap timer managed by the base station, and a HARQ Uplink (UL) Gap timer managed by the base station have all expired.

In accordance with another aspect of the present invention, a mobile terminal is provided. The mobile terminal includes a transceiver for communicating with a base station, a modem for modulating and demodulating signals for transmission via the transceiver or received via the transceiver, and a controller for controlling a sleep cycle of the mobile terminal, the sleep cycle including a listening window and a sleep window, wherein the controller controls the sleep cycle based on an Advanced Mobile Station (AMS) timer, a Hybrid Repeat Request (HARQ) Downlink (DL) Retransmission timer, a HARQ DL Gap timer, and a HARQ Uplink (UL) Gap timer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 6A-6E are flowcharts describing an operation of the AMS timer, a HARQ DL Retransmission timer, a HARQ DL Gap timers, and a HARQ Uplink (UL) Gap timer in an AMS, according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
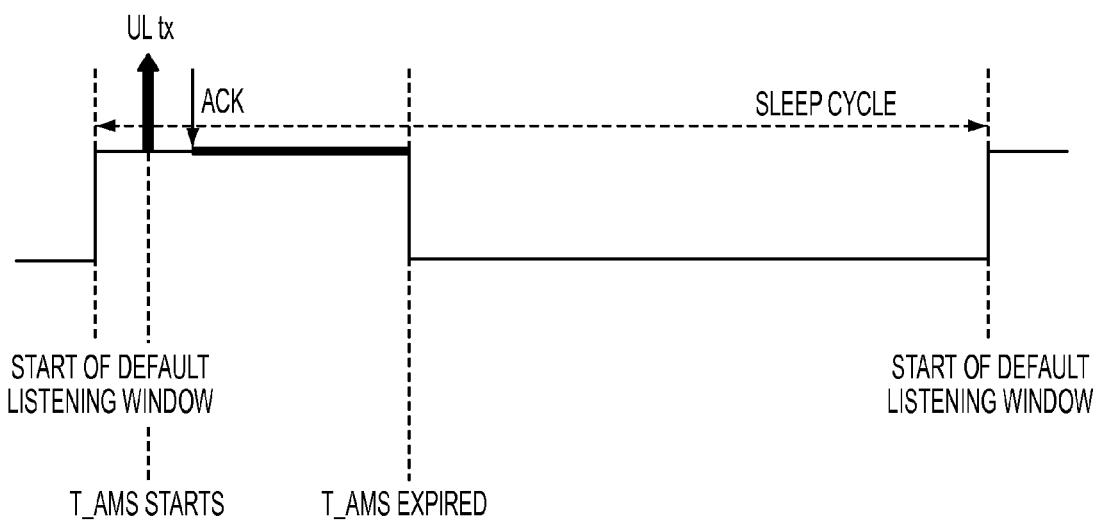
FIG. 1 shows unnecessary use of resources due to misuse of an Advanced Mobile Station (AMS) timer according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile terminal." However, it is to be understood that this is merely a generic term and that exemplary embodiments of the present invention are equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

Entry into the sleep mode may be initiated by either an Advanced Mobile Station (AMS) or an Advanced Base Station (ABS). The parameters of the sleep cycle are negotiated between the AMS and ABS while the AMS is in an active mode. The ABS makes the final decision regarding the AMS request and instructs the AMS to either enter into the sleep mode or remain in the active mode. The negotiation of Sleep Cycle setting is performed by the exchange of corresponding Media Access Control (MAC) management messages AAI_SLP-REQ and AAI_SLP-RSP.

The AMS may initiate the negotiation by sending an AAI_SLP-REQ message requesting entry into the sleep mode. An AAI_SLP-RSP message is transmitted from the serving ABS in response. Alternatively, the ABS may initiate the negotiation by sending an unsolicited AAI_SLP-RSP message to the AMS.

The first sleep cycle on entry to the sleep mode from the active mode contains only a sleep window equal to an initial sleep cycle. Subsequent sleep cycles begin with a listening window. During the listening window, the AMS listens for downlink traffic from the ABS, and as necessary, transmits uplink traffic to the ABS. The sleep window follows the listening window and continues to the end of the current sleep cycle if the listening window does not occupy the full sleep cycle. Unless the listening window of a sleep cycle is neither extended nor terminated early, the length of the listening window is equal to the value of a default listening window parameter. The size of the default listening window is set during the initiation of sleep mode, and may also be changed during a sleep cycle update. The ABS may negotiate with the AMS that the AMS only needs to wake up in certain subframes during each frame in the listening window.

The length of a sleep cycle may be changed implicitly. If the traffic indication message is negative (a negative traffic indication), or if no data traffic is transmitted or received during the listening window, the AMS and ABS updates the length of the Sleep Cycle according to the following formula:

Current Sleep Cycle=min(2×Previous Sleep Cycle, Final Sleep Cycle)

The parameters associated with sleep cycle operation include the default listening window, the initial sleep cycle, the final sleep cycle, and the starting frame number. The default listening window indicates the length of the default listening window, as discussed above. The initial sleep cycle indicates the length of the initial sleep cycle. The final sleep cycle indicates the length of final sleep cycle. The starting frame number indicates the number of the frame where the sleep cycle setting is requested to start taking effect.

Additional parameters include the Listening Window Extension Flag (LWEF) and the Traffic Indication Message Flag (TIMF). If the LWEF is 0, then the listening window is of fixed duration. If the LWEF is 1, then the Listening window is of variable duration and can be extended. If the TIMF is 0, then a traffic indication message is not sent. If the TIMF is 1, then a Traffic Indication Message (TIM) is sent during each listening window. The TIM that traffic is to be sent to the AMS (positive traffic indication) or that no traffic is to be sent to the AMS (negative traffic indication).

When the final sleep cycle is equal to or greater than twice the initial sleep cycle, the length of the sleep cycle exponentially increases until the sleep cycle equals the final sleep cycle. This sleep cycle operation is suitable for a BE-traffic scenario. If the AMS receives a positive traffic indication message, then the length of the sleep cycle is reset to the initial sleep cycle. When the final sleep cycle is equal to the initial sleep cycle, the length of the sleep cycle is fixed. This sleep cycle operation is suitable for a "real-time traffic-only" or a "real-time and BE-traffic mixed" scenario.

During the sleep window, the AMS is "asleep" and thus unavailable to receive any DL data and MAC control signaling from the serving ABS. The AMS may perform power-down, autonomous scan, or any other autonomous operations that do not involve the reception of DL transmissions.

During the listening window, the AMS is available to receive DL data and MAC control signaling from ABS. The AMS may also send data if any uplink data is scheduled for transmission. If traffic indication is enabled, the AMS receives and decodes a traffic indication message sent by an ABS. If not, the AMS ignores the traffic indication message.

The listening window is measured in units of frames. The length of a listening window is governed by the Default Listening window parameter. The AMS ends the listening window according to the following rules:

1: When the AMS receives a control signal from the ABS to terminate the listening window.

2: When the AMS reaches the nominal end of the listening window. The nominal end is the length of the default listening window parameter if the listening window is not extended. If the listening window is extended, the nominal end is the length after adjusting for the length of the last extension.

3: When the AMS reaches the end of the sleep cycle. This may occur when the length of the listening window is the same as the length of the overall sleep cycle.

The serving ABS ends the listening window according to similar rules:

1: When the ABS transmits a control signal to the AMS terminating the listening window.

2: When the ABS reaches the nominal end of the listening window.

3: When the ABS reaches the end of the listening window.

The sleep window of the sleep cycle begins after termination of the listening window. The sleep window continues to the end of the sleep cycle, at which point the AMS and the ABS transition to the listening window for the next sleep cycle. The sleep window does not begin if the listening window takes up the entire sleep cycle.

The traffic indication message is sent for one or more AMS using the AAI_TRF-IND message. Although an exemplary embodiment involving one AMS and one ABS is described herein, the ABS may also communicate and manage sleep cycles of several AMS. The AAI_TRF-IND message is transmitted at the first frame of the listening window of each AMS.

If traffic indication is enabled for an AMS with a SLeePing IDentifier (SLPID) assigned, the AMS waits for a traffic indication message. The SLPID is an identifier assigned to an AMS by the ABS, and is unique for each AMS within an ABS. Upon receiving the traffic indication message, the AMS determines whether the traffic indication is positive or negative. In making this determination, the AMS may refer to the SLPID-Group Indication bit-map and Traffic Indication bit-map or the SLPID assigned to the AMS. If the ABS sends a positive indication to a specific AMS, the ABS transmits at least one DL MAC PDU to the AMS during the AMS's Listening window.

If the AMS receives a negative traffic indication, then the AMS ends the listening window and transitions to the sleep window for the remainder of the sleep cycle, unless the AMS has UL signaling or traffic pending for transmission. If the ABS transmits a negative indication to the AMS, the ABS does not transmit any DL data traffic to the AMS during the remaining part of the listening window, unless there are UL bandwidth requests or a UL MAC Protocol Data Unit (PDU) sent from the AMS which have not been fulfilled.

If the traffic indication message is lost or otherwise not detected by the AMS, the AMS remains awake for the rest of the listening window. If the AMS receives any unicast data during the listening window, then the AMS determines that the traffic indication was positive. If the AMS receives neither the traffic indication message nor any unicast data in the listening window, the AMS remains awake even after the listening window has ended. The AMS then sends a MAC management message (e.g. a signaling header) to request a traffic indication message from the ABS. The ABS responds to the AMS by unicasting a MAC management message containing the traffic indication for that AMS.

The length of the listening window of a sleep cycle may be extended beyond the value of the default listening window parameter setting. The maximum length of a listening window is bounded by the length of the corresponding sleep cycle. The extension of the listening window may be done implicitly or explicitly. The listening window can be extended implicitly if there is an exchange of a new MAC PDU between the AMS and the ABS, if there is a pending Hybrid Automatic Repeat Request (HARQ) retransmission in UL or DL, or if the AMS sends a bandwidth request to the ABS.

The AMS maintains an inactivity timer during the listening window. This timer is referred to as the AMS timer (T_AMS). The ABS maintains a similar timer referred to as the ABS timer (T_ABS). The value of the ABS timer is less than or the same as the AMS timer.

The AMS follows a series of rules to determine whether the AMS should transition to the sleep window or remain in the listening window. If any of the rules for remaining in the listening window are not met, then the AMS remains in the listening window and does not transition to the sleep window. These rules include:

1. The listening window has not been expressly terminated by the ABS.

2. The AMS timer has not expired.

3. A HARQ Retransmission timer (T_HARQ_Retx) has not expired. The HARQ Retransmission timer indicates whether a HARQ transmission/retransmission is pending or expected.

4. The number of HARQ UL burst retransmissions has not reached the maximum number of retransmission attempts.

5. The default listening window has not expired.

The AMS controls the starting/restarting of AMS timer and the HARQ Retransmission timer according to various rules, set forth below:

1. The AMS starts the AMS timer if there is a transmission of new DL/UL MAC PDU between an AMS and an ABS, the AMS starts the T_AMS timer.

2. The AMS restarts the AMS timer if the AMS receives a HARQ ACK or DL MAC PDU or Assignment-A-MAP IE from an ABS.

3. The AMS starts the HARQ Retransmission timer if there is a NAK for HARQ retransmission in UL or DL, the AMS starts the T_HARQ_Retx timer for the associated HARQ process.

4. The AMS sets/resets the HARQ Retransmission timer to zero if there is an ACK for HARQ retransmission in UL or DL.

5. The AMS restarts the HARQ Retransmission timer and increases the number of retransmissions by one if the T_HARQ_ReTx timer expires and the number of retransmissions of the DL HARQ burst is less than the maximal retransmission number, the AMS restarts the T_HARQ_ReTx timer and increases the retransmission number by one.

The ABS also keeps track of the AMS state. The ABS follows rules to determine whether the AMS is in the listening window or the sleep window of the sleep cycle. These rules are similar to the corresponding rules used by the AMS to determine whether to remain in the listening window. The ABS will consider the associated AMS to be in the listening window if any of the following rules are true:

1. The listening window has not been expressly terminated.
2. The ABS timer has not expired.
3. The HARQ Retransmission timer has not expired.
4. The number of DL HARQ burst retransmissions has not reached the maximum number of retransmission attempts. If there is a Negative ACKnowledgement (NACK) for UL HARQ transmission, the ABS does not consider the AMS to enter sleep until the AMS transmits the maximum number of HARQ retransmission. If the maximum retransmissions of the HARQ burst are exhausted, the ABS considers that AMS to have entered sleep.
5. The default listening window has not ended.

As mentioned above, the ABS monitors various timers to determine whether the AMS is in the listening window or the sleep window. The ABS also uses several rules to control the starting/restarting of the ABS timer and the HARQ retransmission timer. These rules are similar to those used by the AMS. These rules include:

1. The ABS starts the ABS timer if there is a transmission of new DL/UL MAC PDU between the AMS and the ABS.

2. The ABS restarts the ABS timer if the ABS receives a HARQ ACK or UL MAC PDU from an AMS, the ABS restarts the T_ABS timer for the AMS.

3. The ABS starts (or restarts, as necessary) the HARQ Retransmission timer if there is a NAK for HARQ retransmission in UL or DL.

4. The ABS sets the HARQ Retransmission timer to 0 if there is an ACK for HARQ retransmission in UL or DL.

As mentioned above, the AMS timer is negotiated between the AMS and the ABS through AAI_SLP-REQ/RSP exchange. The ABS sets the ABS timer based on the negotiated AMS timer. After the default listening window ends, if the ABS timer expires and the number of DL HARQ retransmission is exhausted for DL of the AMS, the ABS either retransmits the HARQ-failed MAC PDU or regards the AMS as returning to sleep (i.e. transitioning to the sleep window).

In order to provide scheduling flexibility and to take advantage of radio link conditions and to reduce control signaling latency of AMSs, the listening window may also be extended explicitly. The ABS may send an explicit signaling in a Sleep Control Extended (SCE) header or a signaling header including the number of frame for extended listening window to control extension of the listening window during the default listening window. Upon receiving the explicit signaling, the AMS terminates the listening window or extends the listening window until the frame specified in the signaling.

The ABS may send an explicit indication to terminate the current listening window. When an ABS has a last PDU in the DL buffer during the listening window, the ABS may transmit an explicit indication to terminate the current listening window. In this case, the ABS regards the AMS as returning to sleep (i.e. transitioning to the sleep window).

During a control signaling transaction between an ABS and an AMS, the AMS remains awake after the AMS has transmitted any UL signaling to which the ABS is expected to respond, unless the AMS is instructed by the ABS to resume normal sleep cycle operation. The UL signaling for which this is applicable includes any type of ranging, any request type subheader, and any MAC management message requiring ABS response. The AMS remains in the listening mode until the expected response is received from the ABS, the required timeout waiting for the ABS response has been reached, or the ABS has indicated a return to normal sleep cycle operation by sending sleep control information to the AMS with a Resume Sleep Cycle indication set.

On the occurrence of any of these events, the AMS returns to normal sleep cycle operation after accounting for the time elapsed during the control signaling transaction. The length and phase of the sleep cycles are not impacted by the interruption.

Sleep mode termination can be initiated by either the AMS or the ABS. If the AMS initiates sleep mode termination, then the AMS sends an AAI_SLP-REQ message with de-activation request, and the ABS responds with the AAI_SLP-RSP message. The ABS may also send an unsolicited AAI_SLP-RSP message to terminate sleep mode. The sleep mode is implicitly terminated when an AMS enters idle mode or performs handover by explicit signaling.

In the event that the ABS-initiated request (unsolicited sleep response) and an AMS-initiated request for sleep mode termination are being handled concurrently, the ABS-initiated request takes precedence over the AMS-initiated request. In this case, even though the AMS receives the ABS-initiated request while the AMS is waiting for AAI_SLP-RSP message in response to AAI_SLP-REQ, the AMS stops the AMS-initiated request and continues with the ABS-initiated request. The ABS ignores an AMS request if the ABS has initiated a change request.

The conventional sleep mode operation does not have a complete scheme for managing the extension of listening window in sleep mode. The conventional sleep mode has several issues. The conventional sleep mode misuses the AMS timer at the AMS regarding UL traffic. As discussed above, the AMS starts the AMS timer if there is a new UL MAC PDU. This is a misuse of the timer because the AMS timer should have been used by the AMS to wait for a certain period in case there is more data transmitted by the ABS using the DL resource. The AMS clearly knows the status of the UL in its own side—the AMS knows whether more buffered data is waiting for UL transmission.

FIG. 1 shows unnecessary use of resources due to misuse of the AMS timer according to the related art.

Referring to FIG. 1, the unnecessary start of T_AMS timer could result in an undue "on" period when the AMS has to monitor Assignment-A-MAP IEs even though none of those IE will exist if the ABS has no pending DL traffic. If the ABS has pending traffic, the ABS would have indicated the pending traffic via a positive traffic indicator and/or a DL Assignment-A-MAP IE.

The conventional sleep mode operation also misuses the ABS timer at the ABS regarding UL traffic. As discussed above, the ABS starts the ABS timer if there is a new UL MAC PDU transmitted to the AMS in sleep mode. This is a misuse of the timer because the ABS is always on, and the ABS is always present to take care of a UL request from the AMS. Therefore, the ABS does not need a timer for monitoring a UL waiting period.

In addition, the conventional sleep mode does not differentiate between DL and UL HARQ operation. As discussed above, the HARQ Retransmission timer is started/restarted if there is a NAK for HARQ retransmission, regardless whether the HARQ transmission is an UL transmission or a DL transmission. In other words, the conventional sleep mode does not differentiate DL and UL HARQ operation.

In IEEE 802.16m, DL HARQ uses asynchronous retransmission; the ABS could flexibly schedule the DL resources for the retransmission of a failed DL HARQ packet. UL HARQ uses synchronous retransmission where the timing and probably even the UL resources are fixed for retransmission of a failed UL HARQ packet. The current design does not take advantage of this difference, and could result in more power consumption for the AMS (see FIG. 3).

The conventional sleep mode also suffers from excessive power consumption due to the extension of listening window. According to the sleep mode outline above, it is implied that the AMS should keep a receiver on for the entire listening window, which could consume significant extra power, especially during HARQ retransmission (see FIG. 3 and FIG. 4 for both UL and DL scenarios)

The conventional sleep mode also includes contradictory conditions regarding the listening window operation. As discussed above, the AMS does not sleep if the default listening window has not ended, which is not always the case. The AMS could transition to the sleep window if the AMS does not receive a negative traffic indicator in the default listening window.

According to an exemplary embodiment of the present invention, the operation in DL is different from the operation in the UL. Both the ABS and the AMS use different timers for DL and UL operation, Because UL HARQ retransmission is synchronous and DL HARQ retransmission is asynchronous, the AMS and the ABS use different timers for UL and DL transmission/retransmission. A timer HARQ UL Gap timer (T_HARQ_UL_Retx_Gap) is used so that the AMS knows when to look for ACK/NACK feedback after the transmission of an UL packet. In the same place, the AMS may also receive an UL assignment allocation IE for the retransmission if NACK is received. A HARQ DL Gap timer (T_HARQ_DL_Retx_Gap) is used for the AMS to know the minimum gap between the current transmission of a DL burst and the next retransmission of the same HARQ process if the current transmission fails. The HARQ DL Retransmission timer (T_HARQ_DL_Retx) is used for the AMS to monitor DL assignment allocation IE after the minimum gap because the DL retransmission is asynchronous and the retransmission does not require fixed periodicity.

Figure 2:
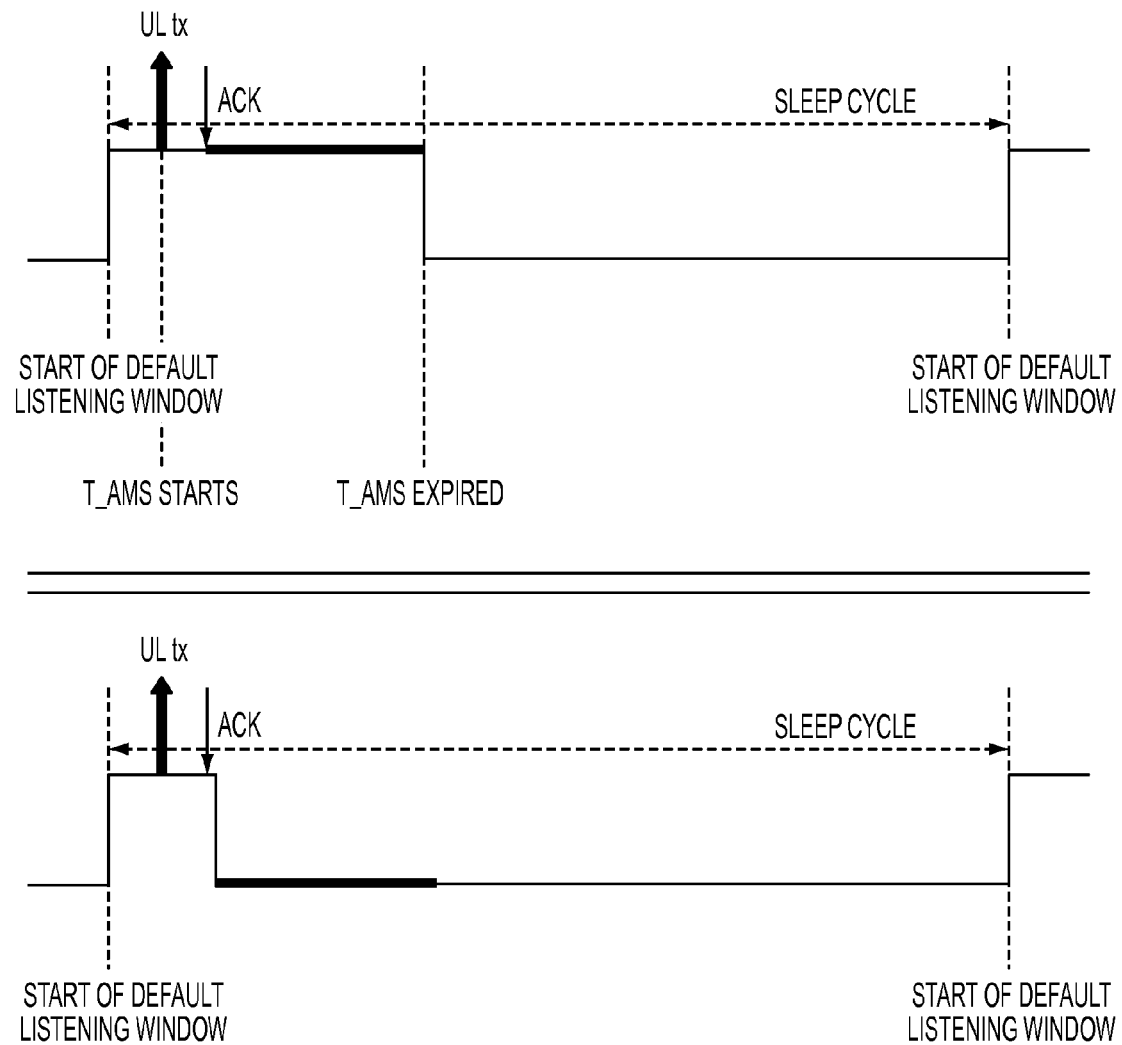
FIG. 2 shows power savings when an AMS does not use an AMS timer to monitor Uplink (UL) activity, according to an exemplary embodiment of the present invention.

FIG. 2 shows power savings when the AMS does not use the AMS timer to monitor UL activity, according to an exemplary embodiment of the present invention.

Referring to FIG. 2, the AMS could save more power using extra "off" time if T_AMS and T_ABS timers are not used for monitoring UL traffic.

Figure 3:
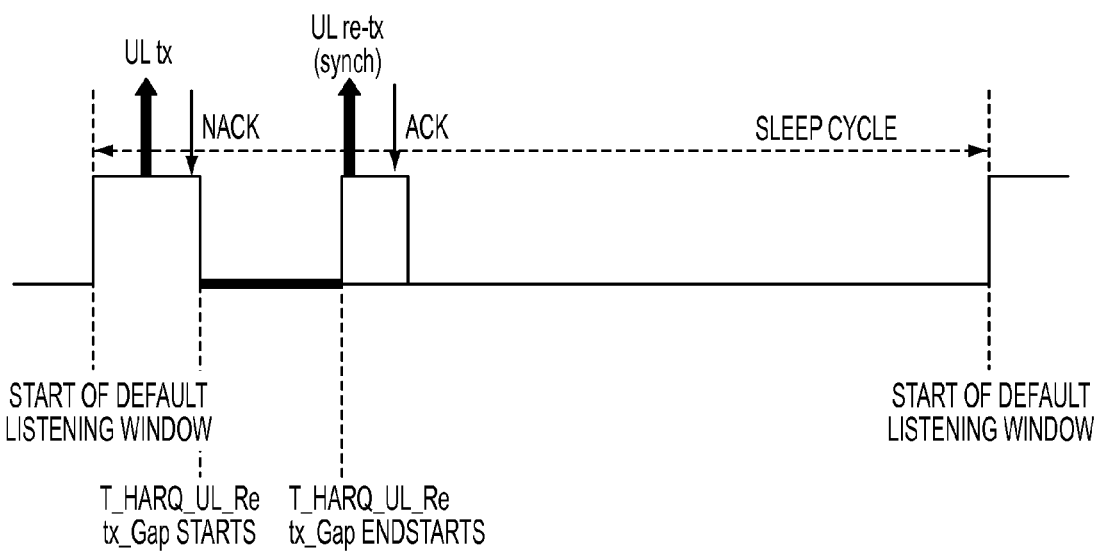
FIG. 3 shows power savings when an AMS employs a HARQ UL Gap timer, according to an exemplary embodiment of the present invention.

FIG. 3 shows power savings when the AMS employs the HARQ UL Gap timer, according to an exemplary embodiment of the present invention.

Referring to FIG. 3, if the AMS timer has expired, the AMS is not required to monitor a UL Assignment-A-MAP IE when the HARQ UL Gap timer is on and not expired. Since HARQ UL is synchronous, the AMS will not be retransmitting the HARQ UL burst before the HARQ UL Gap timer expires. As shown in FIG. 3, if the AMS knows the gap between two synchronous HARQ UL retransmissions, the AMS could save more power using extra "off" time between those two retransmissions without monitoring any UL Assignment-A-MAP IEs, because the AMS knows that no synchronous HARQ UL retransmissions will be transmitted during the gap. This gap is monitored via the HARQ UL Gap timer.

Figure 4:
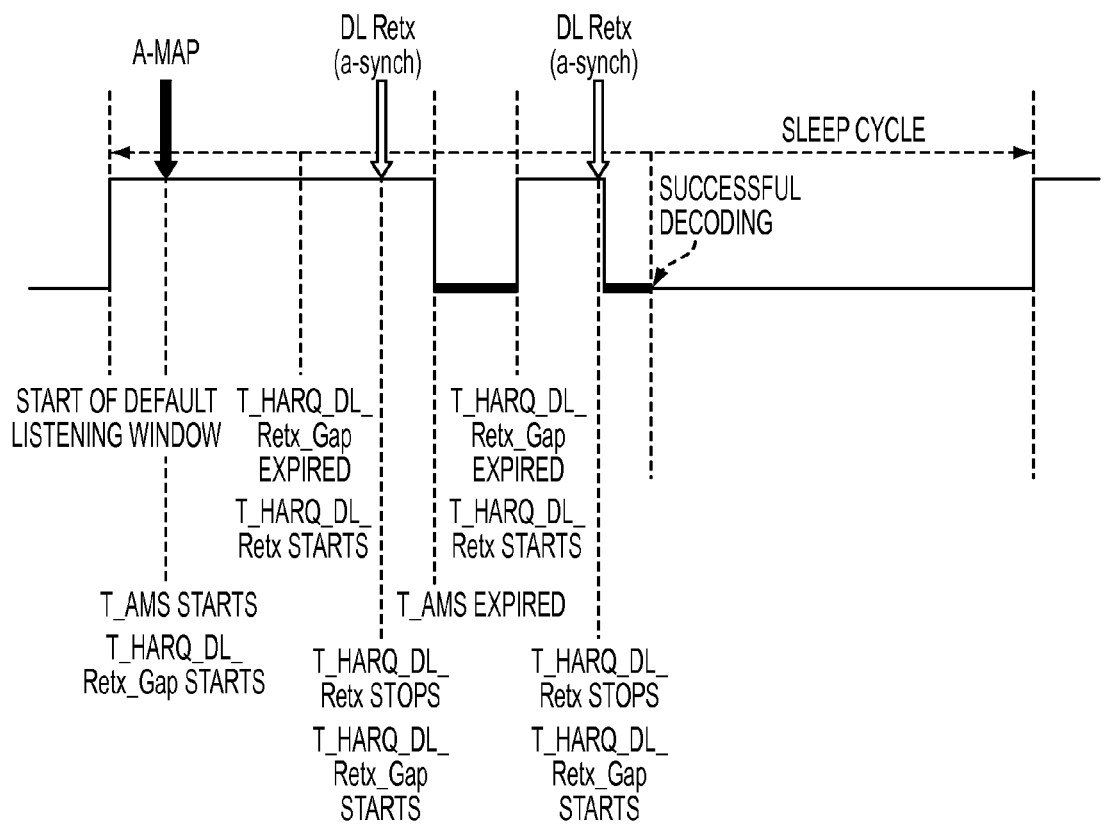
FIG. 4 shows power savings in a Hybrid Automatic Repeat Request (HARQ) Downlink (DL) context, according to an exemplary embodiment of the present invention.

FIG. 4 shows power savings in a HARQ DL context, according to an exemplary embodiment of the present invention.

Referring to FIG. 4, if the AMS timer and the HARQ DL Retransmission timer have both expired, the AMS is not required to monitor DL Assignment-A-MAP IE while the HARQ DL Gap timer is on (not expired). If the AMS knows the minimum gap between two DL HARQ retransmissions, the AMS could save more power using extra "off" time between those two retransmissions without monitoring any DL Assignment-A-MAP IEs, because no DL HARQ retransmission is expected within the minimum gap. This minimum gap is monitored via the HARQ DL Gap timer, even though the DL retransmission is asynchronous in 16 m. The HARQ DL Retransmission timer also indicates that the ABS could schedule the DL retransmission any time after a certain minimum gap from the previous transmission.

According to another exemplary embodiment of the present invention, the ABS restarts the AMS timer in the AMS side by transmitting a new DL MAC PDU before retransmitting the previous HARQ burst when the ABS determines that the AMS timer has expired in the AMS.

A method for extending the listening window according to an exemplary embodiment of the present invention is described below.

The length of the listening window of a sleep cycle may be extended beyond the value of the default listening window parameter setting. The maximum length of a listening window is limited by the length of the corresponding sleep cycle. The extension of the listening window may be done implicitly or explicitly means. The listening window can be extended implicitly in several ways. For example, the listening window may be extended upon the exchange of new MAC PDU (either DL or UL) between an AMS and an ABS. The listening window may also be extended if there is a pending HARQ retransmission in UL or DL. The listening window may also be extended when the AMS sends a bandwidth request to the ABS.

The AMS maintains the AMS timer during the listening window so that the AMS does not return to sleep window if the ABS has indicated pending DL traffic. A similar timer, the ABS timer (T_ABS), is maintained by the ABS so that ABS knows when the AMS timer expires. The value of the ABS timer is less than or the same as T_AMS timer.

Figure 5A:
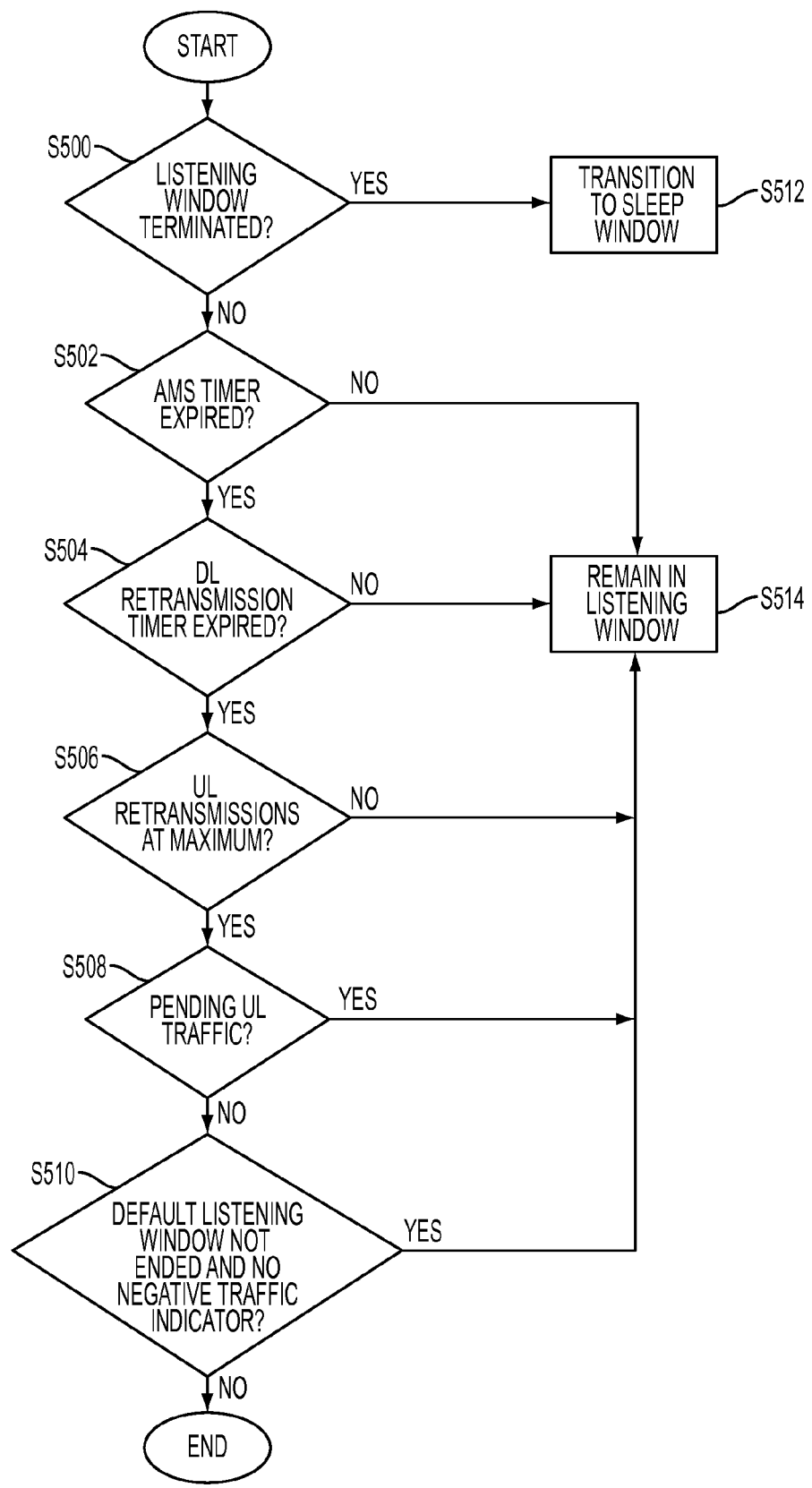
FIGS. 5A and 5B are flowcharts explaining the transition between a listening window and a sleep window, according to an exemplary embodiment of the present invention.
Figure 5B:
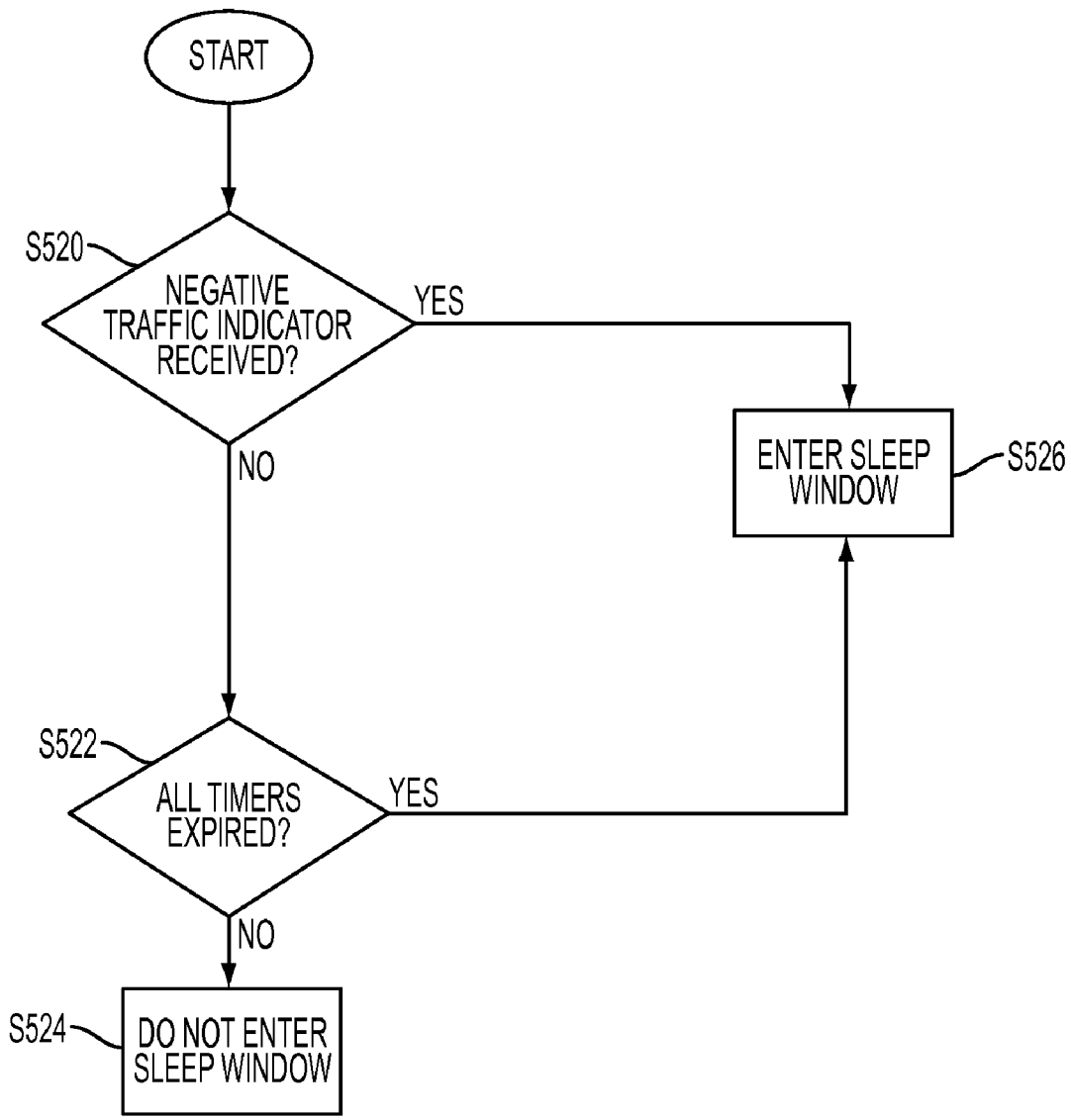

FIGS. 5A and 5B are flowcharts explaining the transition between a listening window and a sleep window, according to an exemplary embodiment of the present invention.

Referring to FIGS. 5A and 5B, the transition from the listening window to the sleep window is governed by a series of guidelines. In some cases, shown in FIG. 5A, the AMS should remain in the listening window. These cases include:

S500: The listening window has been expressly terminated. The ABS may send an explicit indication to terminate the current listening window. When an ABS has a last PDU in the DL buffer during the listening window, the ABS may transmit an explicit indication to terminate the current listening window. If the listening window has been expressly terminated, the AMS transitions to the sleep window in step S512.

S502: The AMS timer has not expired.

S504: The HARQ DL Retransmission timer (T_HARQ_DL_Retx) timer has not expired.

S506: The maximum number of UL retransmissions has not yet been reached.

S508: UL traffic is pending.

S510: The default listening window has not yet expired and a negative traffic indicator has not yet been received.

If none of the conditions in steps S500-S510 have been met, and the listening window has not been expressly terminated, then the AMS is potentially able to transition to the sleep window in step S512. Otherwise, the AMS remains in the listening window in step S514. The conditions in which the AMS may transition to the sleep window are shown in FIG. 5B.

Referring to FIG. 5B, the AMS may transition to the sleep window in step S526 if any of several conditions are met:

S520: The AMS receives a negative traffic indicator.

S522: All timers have expired. The timers include the AMS timer, the HARQ DL Retransmission timer, the HARQ DL Gap timer (T_HARQ_DL_Retx_Gap), and the HARQ UL Gap timer (T_HARQ_UL_Retx_Gap).

If either of the conditions in steps S520 or S522 is met, then the AMS may transition to the sleep window in step S526. Otherwise, the AMS remains in the listening window in step S524.

FIGS. 6A-6E are flowcharts describing an operation of the AMS timer, the HARQ DL Retransmission timer, the HARQ DL Gap timer, and the HARQ UL Gap timer in the AMS, according to an exemplary embodiment of the present invention.

Figure 6A:
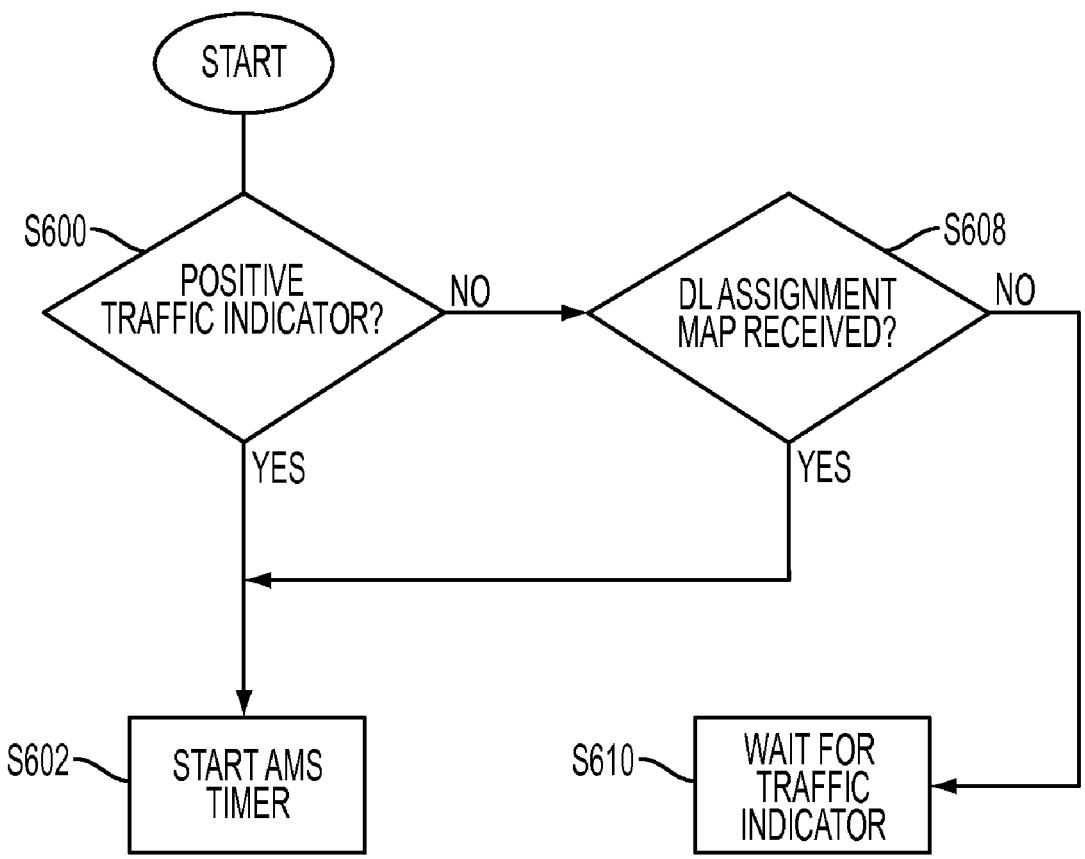

Referring to FIG. 6A, the AMS follows a series of rules to determine the operation of the AMS timer. In step S600, the AMS determines whether a positive traffic indicator has been received. If a positive traffic indicator has been received, then the AMS starts the AMS timer in step S602. If a positive traffic indicator has not been received, then the AMS determines in step S608 whether a DL Assignment MAP has been received. If the DL Assignment MAP has been received, then the AMS also starts the AMS timer. Otherwise, the AMS waits for a traffic indicator in step S610.

If a last DL MAC Protocol Data Unit (PDU) has been received, then the AMS stops the AMS timer. The stopping of the AMS timer may lead to a transition to the sleep window according to the rules defined in FIGS. 5A and 5B. Otherwise, the AMS waits for transmission of a DL MAC PDU. While waiting, the AMS may perform other operations related to the listening window.

Referring to FIG. 6B, the AMS follows a series of rules to determine when to start, stop, or restart, the HARQ DL Retransmission timer and the HARQ DL Gap timer. As with the operation of the AMS timer, the AMS may transition to the sleep window at any point if the conditions for transitioning to the sleep window shown in FIG. 5B are met.

In step S620, the AMS receives a HARQ DL transmission from the ABS. If the HARQ DL transmission is successfully decoded, the AMS transmits an ACK response to the ABS and sets the HARQ DL Retransmission timer to 0 in step S630.

If the HARQ DL transmission is not successfully decoded, the AMS transmits a NACK response to the ABS, and starts the HARQ DL Gap timer in step S622. If the HARQ DL Gap timer has already started, then the AMS restarts the HARQ DL Gap timer. In step S624, the AMS determines whether the AMS timer and the HARQ DL Retransmission timers have expired. If the AMS timers and the HARQ DL Retransmission timers have expired, then in step S626 the AMS determines whether the HARQ DL Gap timer has also expired. If the HARQ DL Gap timer has not yet expired, then in step S628 the AMS does not need to monitor for HARQ DL retransmissions until the HARQ DL Gap timer expires. This may result in the AMS entering an off state during this period, according to the exemplary embodiment disclosed above with respect to FIG. 4.

If either the AMS timer or the HARQ DL Retransmission timer has not yet expired in step S624, or the AMS started the HARQ DL Retransmission timer in step S632, the AMS monitors for HARQ DL retransmission in step S631. The AMS continues to monitor for HARQ DL retransmission until the HARQ DL Retransmission timer expires.

Referring to FIG. 6C, in step S634, when the AMS receives a DL MAC PDU, the AMS stops the HARQ DL Retransmission timer in step S636. The AMS then processes the DL MAC PDU in step S638.

Referring to FIG. 6D, when the HARQ DL Retransmission timer expires in step S640, the AMS determines whether the maximum number of HARQ DL retransmissions has been reached in step S642. If the maximum number of HARQ DL retransmissions has not yet been reached, the AMS increases the number of HARQ DL retransmissions by one in step S644, and restarts the HARQ DL Retransmission timer in step S646. If the maximum number of HARQ DL retransmissions has been reached, the AMS does not restart the HARQ DL Retransmission timer, and the AMS may stop monitoring for the DL assignment regarding the retransmission of the HARQ burst. While the AMS is performing these operations, the AMS monitors the status of the HARQ DL Retransmission timer and the HARQ DL Retransmission Gap timer to determine whether a condition for transition to the sleep mode has been satisfied, as described above with respect to FIGS. 5A and 5B.

Figure 6E:
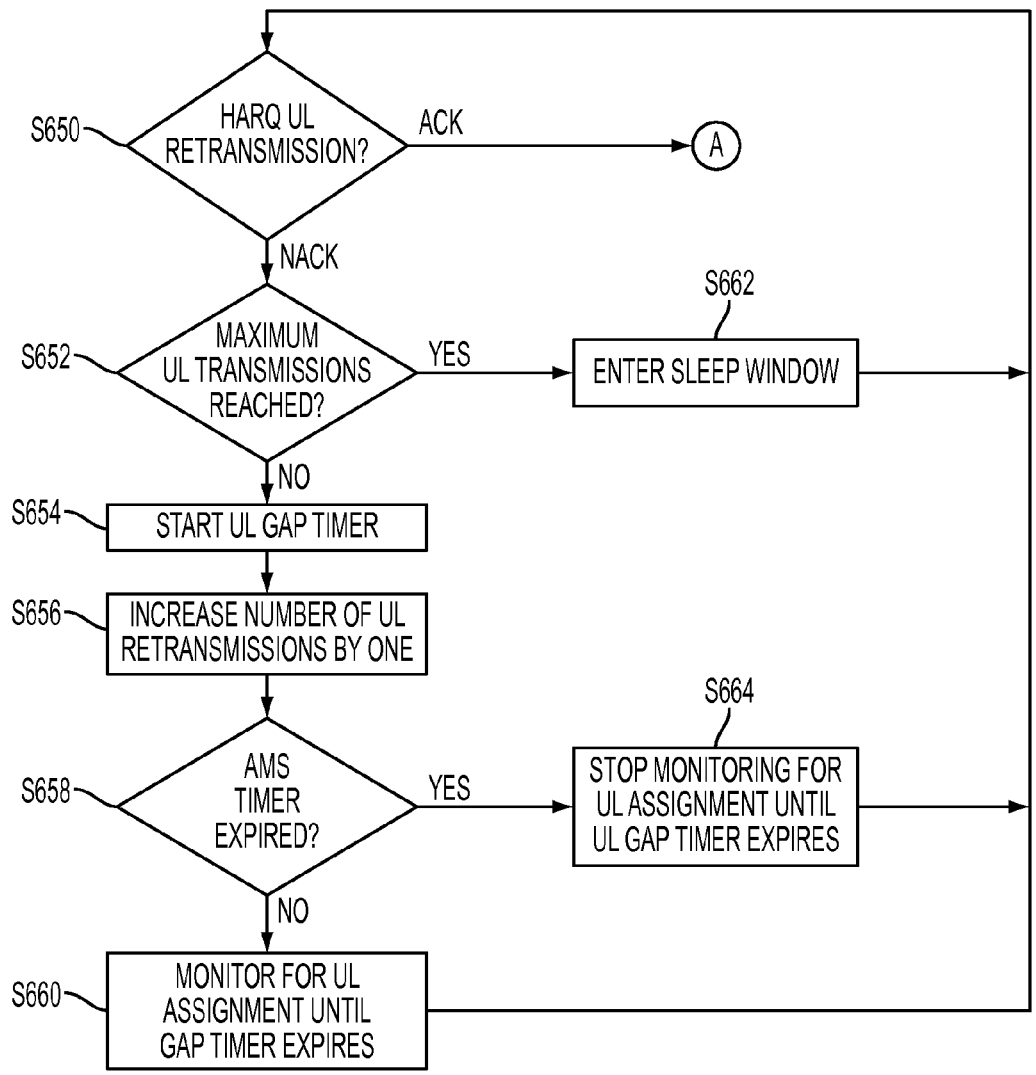

Referring to FIG. 6E, the AMS follows a series of rules to control the starting of the HARQ UL Gap timer. In step S650, the AMS transmits a HARQ UL burst to the ABS. If the AMS receives an ACK from the ABS indicating that the HARQ UL was successfully received, the AMS sets the HARQ DL Retransmission timer to 0 in step S630 (FIG. 6B).

If the AMS receives a NACK from the ABS, then in step S652 the AMS determines whether the maximum number of HARQ UL retransmissions has been reached. If the maximum number of HARQ UL retransmissions has been reached, then in step S662 the AMS transitions to the sleep window. Otherwise, the AMS starts the HARQ UL Gap timer in step S654. In step S656, the AMS increases the number of UL retransmissions by one.

In step S658, the AMS determines whether the AMS timer has expired. If the AMS timer has expired, then in step S664, the AMS does not need to monitor for a UL Assignment MAP IE until the HARQ UL Gap timer has expired. Instead, the AMS may enter an off mode as described above with respect to FIG. 3. If the AMS timer has not yet expired, then in step S660 the AMS monitors for a UL Assignment MAP IE until the HARQ UL Gap timer expires. Once the HARQ UL Gap timer expires, the AMS returns to step S650 and retransmits the HARQ UL burst.

FIGS. 7A-7E disclose operations of the ABS according to an exemplary embodiment of the present invention.

Figure 7A:
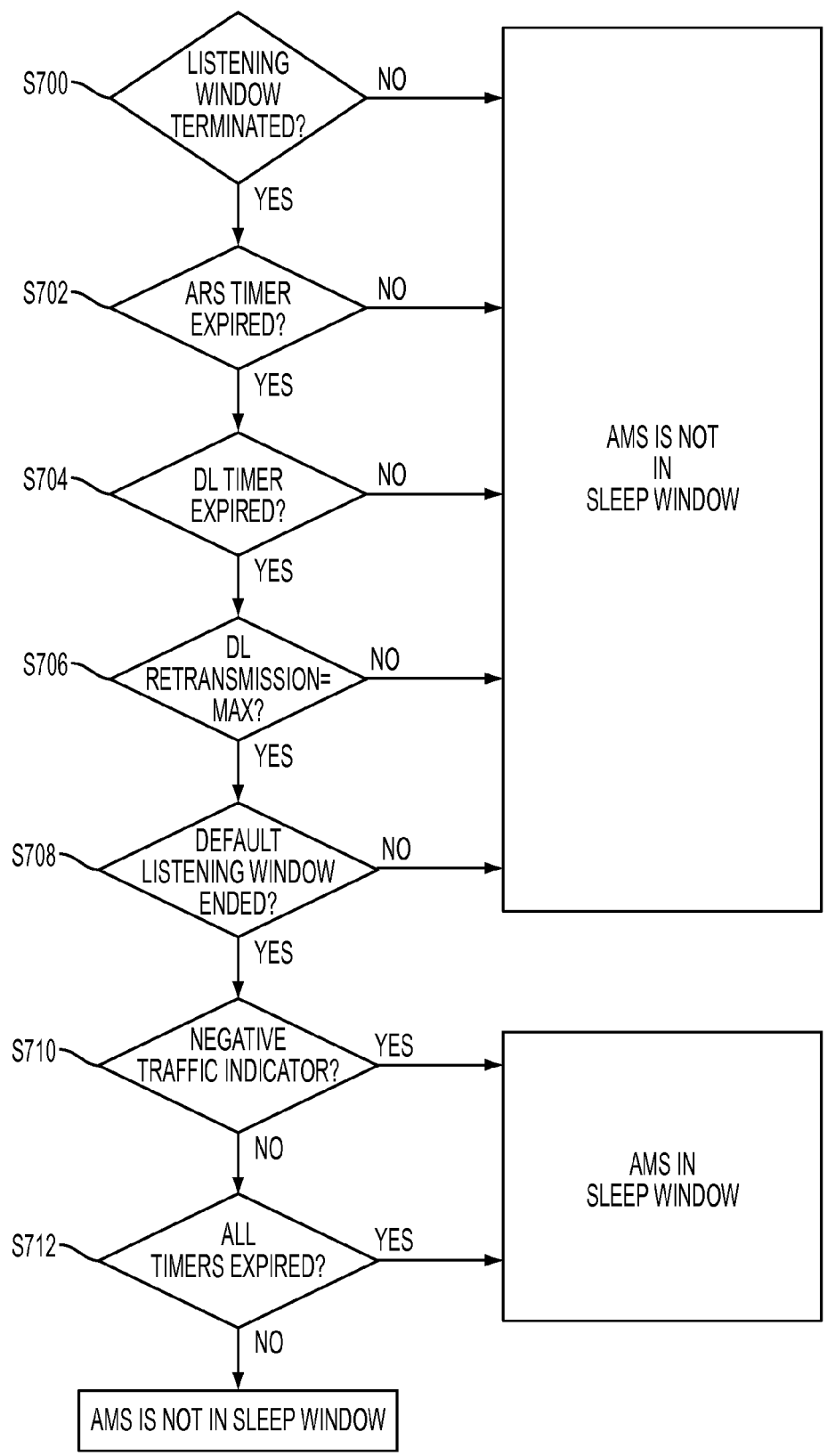
FIGS. 7A-7E show operations of an Advanced Base Station (ABS) according to an exemplary embodiment of the present invention.
Figure 7B:
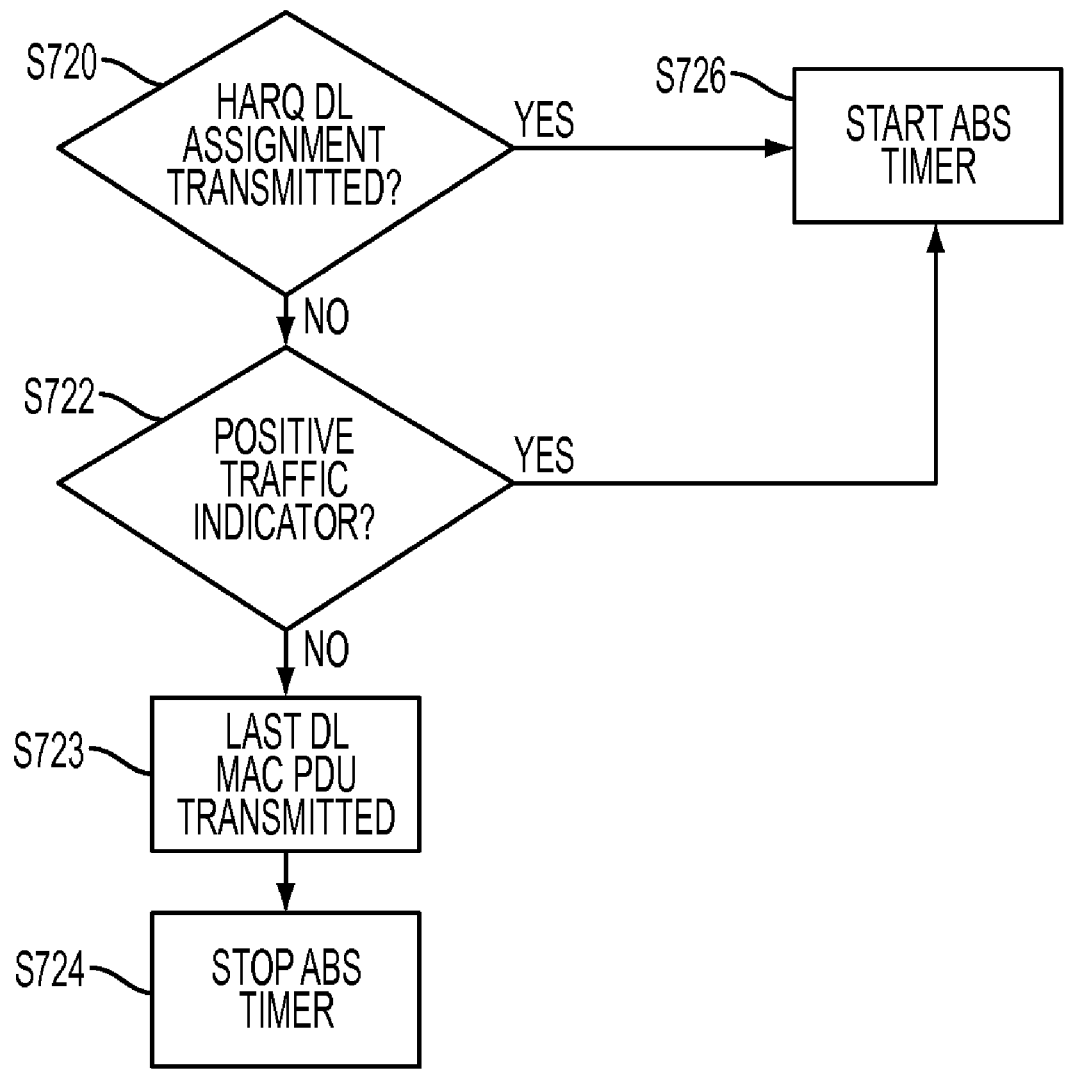

Referring to FIG. 7A, the ABS determines whether the AMS is in the sleep window according to a series of rules shown in FIGS. 7A and 7B. The ABS will not consider the AMS to be in the sleep window if any of the following conditions are true:

S700: The listening window has not been expressly terminated. An exemplary mechanism for expressly terminating the listening window is described above with respect to FIG. 6A.

S702: The ABS timer has not expired. The ABS timer is maintained by the ABS and corresponds generally to the AMS timer, except that the ABS timer will have a value less than or equal to the AMS timer, in order to avoid a situation where the AMS timer has not expired but the ABS timer has expired. Such a situation could lead the ABS to erroneously conclude that the AMS has entered the sleep window.

S704: The HARQ DL Retransmission timer has not expired.

S706: The number of HARQ DL retransmissions has not reached the maximum number.

S708: The default listening window has not ended.

In some circumstances, the ABS will be able to conclude that the AMS has entered the sleep window. If any of these conditions are true, the ABS determines that the AMS is in the sleep window:

S710: The ABS has received or transmitted a negative traffic indicator.

S712: All timers have expired. The timers include the ABS timer, the HARQ DL Retransmission timer, the HARQ DL Gap timer, and the HARQ UL Gap timer.

Referring to FIG. 7B, the ABS starts or stops the ABS timer according to several rules. The ABS will start the ABS timer upon transmission of a DL assignment for a new DL MAC PDU, step S720, or upon transmission of a positive traffic indicator, step S722. The ABS stops the ABS timer when the ABS transmits an express indication of the last DL MAC PDU to the AMS, step S724.

Figure 7C:
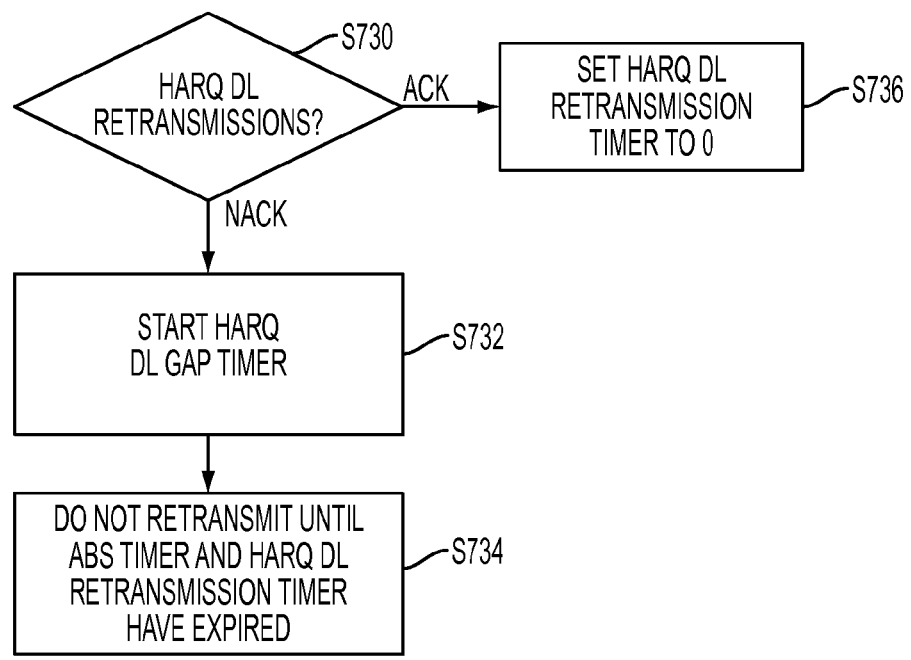

Referring to FIG. 7C, the ABS controls the HARQ DL Retransmission timer and the HARQ DL Gap timer according to the method shown. In step S730, the ABS performs a HARQ DL retransmission to the ABS and waits for a response. If the ABS receives an ACK, indicating successful transmission, then the ABS sets the HARQ DL Retransmission to 0 in step S736. If the ABS receives a NACK, indicating unsuccessful transmission, then the ABS starts the HARQ DL Gap timer in step S732. In step S734, the ABS waits to perform HARQ DL retransmission until both the ABS timer and the HARQ DL Retransmission timer have expired.

Figure 7D:
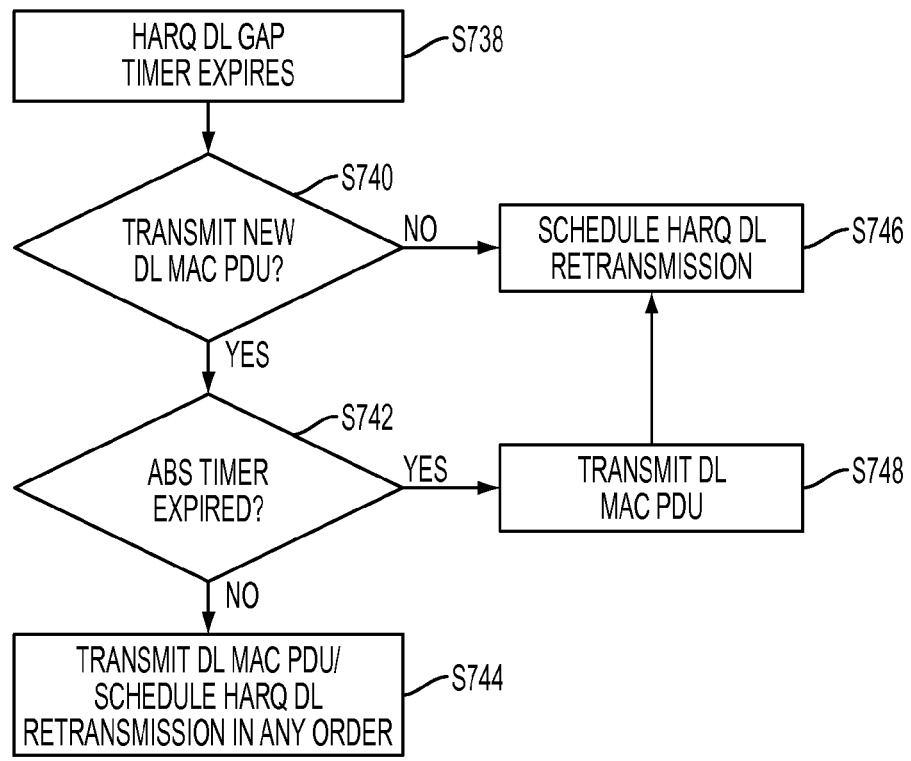

Referring to FIG. 7D, in step S738, when the HARQ DL Gap timer has expired, the ABS determines whether a new DL MAC PDU should be transmitted in step S740. If the DL MAC PDU does not need to be transmitted to the AMS, then the ABS schedules a retransmission of the HARQ DL burst, and at the scheduled time returns to step S746 to retransmit the HARQ DL burst.

If a new DL MAC PDU should be transmitted, the ABS determines whether the ABS timer has expired in step S742. If the ABS timer has expired, then the ABS transmits the DL MAC PDU to the AMS in step S748 before scheduling the HARQ DL burst retransmission in step S746. If the ABS timer has not yet expired, then the ABS may, in step S744, transmit the DL MAC PDU and schedule the HARQ DL retransmission in any order.

Figure 7E:
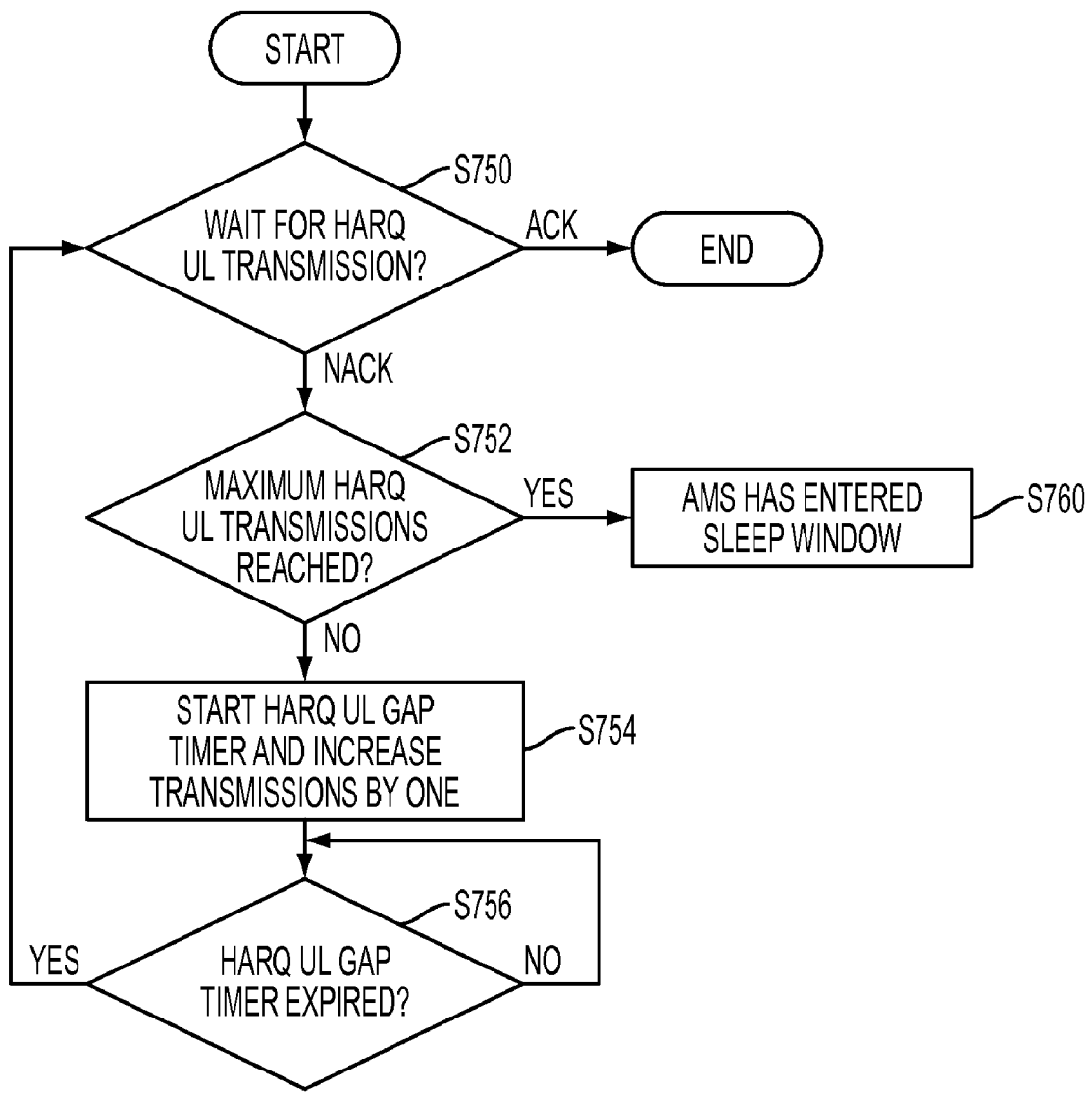

Referring to FIG. 7E, the ABS controls the operation of the HARQ UL Gap timer according to a series of operations. In step S750, the ABS waits for the AMS to transmit a HARQ UL burst, and then processes the received burst. If the processing is successful, the ABS transmits an ACK message to the AMS in step S758. If the processing is not successful, the ABS transmits a NACK message to the AMS and, in step S752, determines whether the maximum number of HARQ UL bursts have been attempted. If the maximum number of HARQ UL bursts has been attempted, the ABS determines that the AMS has entered the sleep window in step S760.

If the maximum number of HARQ UL retransmissions has not been reached, then the ABS increases the number of HARQ UL retransmissions by one and starts the HARQ UL Gap timer in step S754. The AMS then waits until the HARQ UL Gap timer expires in step S756. Once the HARQ UL Gap timer expires, the ABS returns to step S750 and waits for transmission of a HARQ UL burst. The AMS need not monitor for HARQ UL burst transmissions during this time. Since the HARQ UL is synchronous, the ABS knows when the next HARQ UL burst transmission will occur, and need not monitor for additional HARQ UL burst transmissions until the next period for HARQ UL burst transmission. This information is reflected in the HARQ UL Gap timer.

The T_AMS timer, T_HARQ_DL_Retx timer, T_HARQ_DL_Retx_Gap timer, and the T_HARQ_UL_Retx_Gap timer are negotiated between the AMS and the ABS through AAI_SLP-REQ/RSP exchange. The ABS sets the T_ABS timer based on the negotiated T_AMS timer.

After the default listening window ends, if the T_ABS timer expires and the number of DL HARQ retransmission is exhausted for DL of the AMS, the ABS regards the AMS as returning to sleep (i.e., transitioning to the sleep window).

In order to provide scheduling flexibility and to take advantage of radio link conditions and to reduce control signaling latency of AMSs, the listening window may also be extended explicitly. The ABS may send an explicit signaling in a sleep control extended header or signaling header including the number of the frame for extended listening window to control extension of Listening window during the default listening window. Upon receiving the explicit signaling, the AMS extends the listening window until the frame specified in negotiations with the ABS or terminates the listening window.

The ABS may transmit an express request to the ABS to terminate the current listening window. When the ABS has the last PDU in the DL buffer during the listening window, the ABS may transmit an express indication to terminate the current listening window. In this case, the ABS regards the AMS as returning to sleep (i.e. transitioning to the sleep window).

Figure 8:
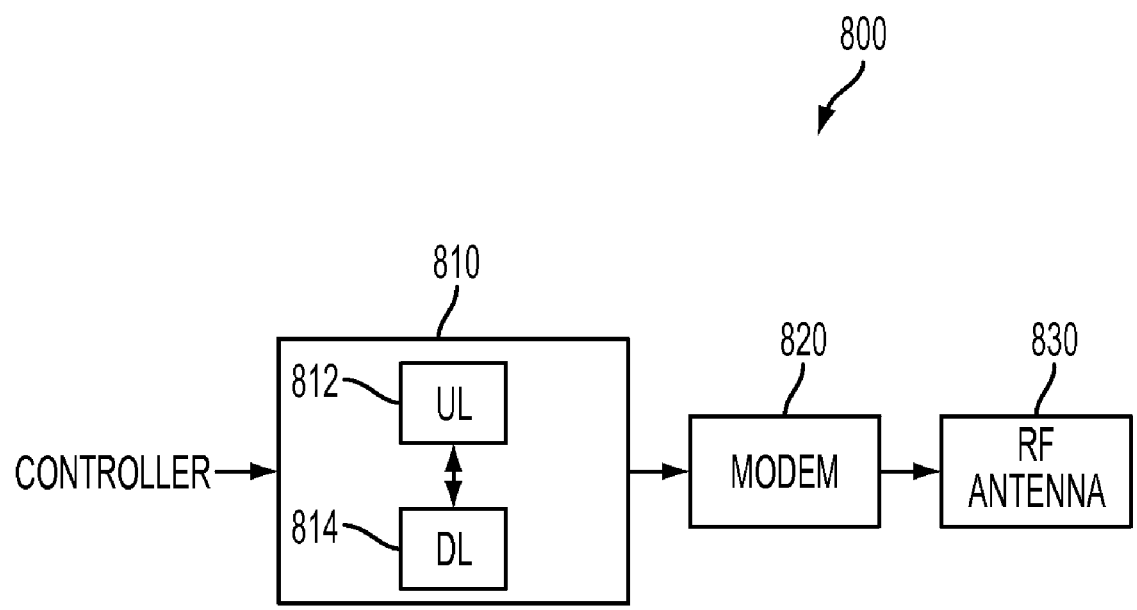
FIG. 8 shows an AMS according to an exemplary embodiment of the present invention.

FIG. 8 shows an AMS according to an exemplary embodiment of the present invention.

Referring to FIG. 8, the AMS 800 includes a controller 810, a modem 820, and an RF transceiver 830. Although not shown, the AMS may include various other components. For example, the AMS may include a processor, a storage unit to store applications and data, an input/output unit, and the like. In the case of a mobile terminal such as a mobile phone, circuitry to implement the specific functions of the mobile terminal (e.g. telephony) may also be provided.

The controller 810 controls the transitions to and from the sleep cycle, as well as the transitions within the sleep cycle, including the transitions to/from the sleep window and to/from the listening window. The controller 810 monitors the AMS timer, the HARQ DL Retransmission timer, the HARQ DL Gap timer, and the HARQ UL timer, and determines whether to transition to the sleep window according to the rules and operations described above with respect to FIGS. 6A-6E.

The controller 810 also includes a UL module 812 and a DL module 814. The UL module 812 controls the operation of the sleep cycle with respect to UL operations. Accordingly, the UL module controls the starting and monitoring of the HARQ UL Gap timer, as described above with respect to FIGS. 6A-6E. The UL module 812 also communicates with the DL module 814 and the controller 810 to determine whether to transition to the sleep window or to a temporary "off" period in which no monitoring for UL transmissions need occur.

Similarly, the DL module 814 controls the starting, stopping, and monitoring of the HARQ DL Retransmission timer and the HARQ DL Gap timer. The DL module 814 also communicates with the controller 810 to monitor and control the AMS timer. The DL module 814 may perform the operations described above with respect to FIG. 6B to control the HARQ DL Retransmission timer and HARQ DL Gap timer.

The controller 810 controls the AMS timer based on information provided by the UL module 812 and the DL module 814. In addition, the controller 810 determines when to transition to the sleep mode based on the information provided by the UL module 812 and the DL module 814, according to the rules described above with respect to FIGS. 5A and 5B. For example, when the UL module 812 indicates that the HARQ UL Gap timer has expired, the DL module 814 indicates that the HARQ DL Retransmission timer and the HARQ DL Gap timer has expired, and the controller 810 determines that the AMS timer has expired, the controller 810 may transition to the sleep window as indicated in FIG. 5B.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing a sleep cycle in a mobile terminal, and the method comprising:
    entering, by the mobile terminal, a listening window of the sleep cycle;
    remaining in the listening window while an Advanced Mobile Station (AMS) timer maintained by the mobile terminal has not expired, while a Hybrid Automatic Repeat Request (HARQ) Downlink (DL) Retransmission timer has not expired, while a maximum number of Uplink (UL) retransmissions has not been reached, while UL traffic from the mobile station is pending for transmission, or while a default listening window has not expired and no negative traffic indication has been received from a base station; and
    transitioning, by the mobile terminal, from the listening window to a sleep window of the sleep cycle when the mobile terminal receives a negative traffic indication from the base station or when the AMS timer, the HARQ DL Retransmission timer, a HARQ DL Gap timer, and a HARQ UL Gap timer have all expired,
    wherein the mobile terminal does not transmit or receive data to or from the base station while operating in the sleep window.

2. The method of claim 1, further comprising:
    starting, by the mobile terminal, the AMS timer when a positive traffic indication has been received by the mobile terminal or when a DL Assignment MAP Information Element has been received; and
    stopping, by the mobile terminal, the AMS timer when a last DL Media Access Control Protocol Data Unit (DL MAC PDU) has been received from the base station.

3. The method of claim 1, further comprising:
    setting, by the mobile terminal, the HARQ DL Retransmission timer to 0 when the mobile terminal successfully decodes a HARQ DL burst received from the base station;
    starting the HARQ DL Gap timer when the mobile terminal does not successfully decode the HARQ DL burst;
    when the AMS timer and the HARQ DL Retransmission timer have expired, stopping a monitoring for HARQ DL transmissions while the HARQ DL Gap timer has not expired;
    when the HARQ DL Gap timer has expired, starting the HARQ DL Retransmission timer and monitoring for HARQ DL transmissions;
    stopping the HARQ DL Retransmission timer when the mobile terminal receives a DL MAC PDU before expiration of the HARQ DL Retransmission timer; and
    when the HARQ DL Retransmission timer expires, determining whether a maximum number of DL retransmissions has been reached, and when the maximum number of DL retransmissions has not been reached, increasing a number of DL retransmissions by one and restarting the HARQ DL Retransmission timer.

4. The method of claim 1, further comprising:
    transmitting a HARQ UL burst to the base station;
    when the mobile terminal receives a Negative ACKnowledgement (NACK) message from the base station indicating that the base station did not successfully receive the HARQ UL burst, transitioning to the sleep window when a maximum number of HARQ UL bursts retransmission attempts have occurred, and when the maximum number of HARQ UL burst retransmission attempts have not yet occurred:
        increasing the number of HARQ UL burst retransmission attempts by one,
        starting or restarting the HARQ UL Gap timer,
        stopping a monitoring for a UL Assignment MAP IE while neither the HARQ UL Gap timer nor the AMS timer has expired; and
    retransmitting the HARQ UL burst when the HARQ UL Gap timer expires.

5. The method of claim 4, further comprising:
    powering down at least one component of the mobile terminal while the mobile terminal is not monitoring for a UL Assignment MAP IE.

6. A method for managing a sleep cycle of a mobile terminal in a base station, the method comprising:
    determining that the mobile terminal is still in a listening window of the sleep cycle when the listening window has not been expressly terminated by the base station, an Advanced Base Station (ABS) timer managed by the base station has not expired, a Hybrid Automatic Repeat Request (HARQ) Downlink (DL) Retransmission timer managed by the base station has not expired, a number of retransmissions of a DL HARQ burst is not equal to a maximum number of DL HARQ burst retransmissions, and a default listening window period has not ended and a negative traffic indicator has not been sent to the mobile terminal; and
    determining that the mobile terminal has entered a sleep window of the sleep cycle when a negative traffic indicator is transmitted to the mobile terminal from the base station, and the ABS timer, the HARQ DL Retransmission timer, a HARQ DL Gap timer managed by the base station, and a HARQ Uplink (UL) Gap timer managed by the base station have all expired.

7. The method of claim 6, further comprising:
starting the ABS timer when the base station transmits a DL assignment for a new DL Media Access Control (MAC) Protocol Data Unit (PDU) to the mobile terminal or when the base station transmits a positive traffic indicator to the mobile terminal; and
stopping the ABS timer when the base station transmits an express indication of a final DL MAC PDU to the mobile terminal.

8. The method of claim 6, further comprising:
transmitting a HARQ DL burst to the mobile terminal;
when the base station receives a Negative ACKnowledgement (NACK) message from the mobile terminal indicating a failure to correctly receive the HARQ DL burst, starting the HARQ DL Gap timer;
when the base station receives an ACK message from the mobile terminal indicating correct reception of the HARQ DL burst, setting the HARQ DL Retransmission timer to 0; and
when the HARQ DL Gap timer expires, scheduling a retransmission of the HARQ DL burst to the mobile terminal,
wherein the base station does not transmit data to the mobile terminal if both the ABS timer and the HARQ DL Retransmission timer have expired.

9. The method of claim 8, further comprising:
when the base station needs to transmit a new DL MAC PDU to the mobile terminal after the ABS timer has expired, transmitting the new DL MAC PDU to the mobile terminal prior to retransmitting the DL HARQ burst.

10. The method of claim 6, further comprising:
receiving a HARQ UL burst from the mobile terminal;
decoding the HARQ UL burst;
when the HARQ UL burst is not successfully decoded and a maximum number of HARQ UL transmissions has been reached, determining that the mobile terminal has transitioned to the sleep window; and
when the HARQ UL burst is not successfully decoded and the maximum number of HARQ UL transmissions has not been reached, starting the HARQ UL Gap timer.

11. A mobile terminal, comprising:
a transceiver for communicating with a base station;
a modem for modulating and demodulating signals for transmission via the transceiver or received via the transceiver; and
a controller for controlling a sleep cycle of the mobile terminal, the sleep cycle including a listening window and a sleep window,
wherein the controller controls the sleep cycle based on an Advanced Mobile Station (AMS) timer, a Hybrid Repeat Request (HARQ) Downlink (DL) Retransmission timer, a HARQ DL Gap timer, and a HARQ Uplink (UL) Gap timer.

12. The mobile terminal of claim 11, wherein the controller controls the mobile terminal to remain in the listening window while the AMS timer has not expired, the HARQ DL Retransmission timer has not expired, a maximum number of UL retransmissions has not been reached, or while a length of the listening window has not reached a default value and no negative traffic indication has been received from the base station.

13. The mobile terminal of claim 11, wherein the controller controls the mobile terminal to transition to the sleep window when the mobile terminal receives a negative traffic indication from the base station or when the AMS timer, the HARQ DL Retransmission timer, the HARQ DL Gap timer, and the HARQ UL Gap timer have all expired.

14. The mobile terminal of claim 11, wherein:
the controller starts the AMS timer when the mobile terminal has received a positive traffic indication from the base station or when the DL Assignment MAP Information Element for a new DL MAC PDU has been received; and
the controller stops the AMS timer when a last DL MAC PDU has been received.

15. The mobile terminal of claim 11, wherein:
the controller starts the HARQ DL Gap timer when the mobile terminal is unable to decode a HARQ DL transmission received from the base station;
the controller does not monitor for reception of a DL Assignment MAP IE when the HARQ DL Gap timer has not expired and both the AMS timer and the HARQ DL Retransmission timer have expired;
when the HARQ DL Gap timer expires, the controller starts the HARQ DL Retransmission timer and monitors for a DL Assignment MAP IE regarding the HARQ DL burst until the HARQ DL Retransmission timer expires;
when the mobile terminal receives a DL MAC PDU from the base station, the controller stops the DL Retransmission timer; and
when the DL Retransmission timer expires and number of HARQ DL burst retransmissions is less than a maximum number, the controller restarts the HARQ DL Retransmission timer and increases the number of HARQ DL burst retransmissions by one.

16. The mobile terminal of claim 11, wherein:
when the mobile terminal receives a Negative ACKnowledgement (NACK) indicating a failure to successfully decode HARQ UL burst transmission from the mobile terminal to the base station, and a number of retransmissions of the HARQ UL burst is equal to a maximum number of HARQ UL burst retransmissions, the controller determines that the mobile terminal may transition to the sleep window;
when the mobile terminal receives the NACK and the number of retransmissions of the HARQ UL burst is less than the maximum number of HARQ UL burst retransmissions, the controller increases the number of retransmissions of the HARQ UL burst by one and starts the HARQ UL Gap timer; and
when the HARQ UL Gap timer expires, the controller controls the mobile terminal to retransmit the HARQ UL burst.

* * * * *